(12) United States Patent
Paisley (10) Patent No.: US 6,808,543 B2
(45) Date of Patent: Oct. 26, 2004

(54) BIOMASS GASIFICATION SYSTEM AND METHOD

(75) Inventor: Mark A. Paisley, Columbus, OH (US)

(73) Assignee: Ferco Enterprises, Inc., Norcross, GA (US)

( * ) Notice: Subject to any disclaimer, the term of this patent is extended or adjusted under 35 U.S.C. 154(b) by 455 days.

(21) Appl. No.: 10/037,980

(22) Filed: Dec. 20, 2001

(65) Prior Publication Data

US 2002/0134019 A1 Sep. 26, 2002

Related U.S. Application Data

(60) Provisional application No. 60/257,427, filed on Dec. 21, 2000.

(51) Int. Cl.[7] .................................................. C10J 3/54
(52) U.S. Cl. ..................... 48/197 R; 48/203; 48/209; 48/210; 48/197 FM; 422/139; 422/145; 422/146
(58) Field of Search ................ 48/197 R, 197 FM, 48/203, 209, 210, 61, 62 R, 71, 72, 73, 77, 85.2, 89, 98–101, 108, 111, 119, 200, 201; 422/139, 140, 143, 144, 145, 146, 147, 211

(56) References Cited

U.S. PATENT DOCUMENTS

| | | |
|---|---|---|
| 610,066 A | 8/1898 | Kuser |
| 4,253,408 A | 3/1981 | Kramer |
| 4,616,574 A | 10/1986 | Abrams et al. |
| 4,641,864 A | 2/1987 | Heine et al. |
| 4,676,177 A * | 6/1987 | Engstrom ................... 110/345 |
| 4,771,712 A | 9/1988 | Engstrom et al. |
| 4,828,581 A | 5/1989 | Feldmann et al. |
| 5,001,994 A | 3/1991 | Morimoto et al. |
| 5,060,984 A | 10/1991 | Hess |
| 5,141,708 A | 8/1992 | Campbell, Jr. et al. |
| 5,463,968 A | 11/1995 | Abdulally |
| 6,065,409 A | 5/2000 | Morin |
| 6,202,576 B1 | 3/2001 | Nagl et al. |
| 6,269,778 B1 | 8/2001 | Anderson et al. |

* cited by examiner

Primary Examiner—Samuel M. Heinrich
(74) Attorney, Agent, or Firm—Troutman Sanders LLP; Ryan A. Schneider (57) ABSTRACT

An improved system and method is provided for operating a parallel entrainment fluidized bed gasifier system. A first aspect of the present invention relates to a method for reducing ash agglomeration in a parallel entrainment fluidized bed gasifier/combustor system by adding a quantity of MgO to the feedstock used in the gasifier/combustor system. A second aspect of the present invention relates to an apparatus and method for reducing erosion at piping bends in fluidized particulate piping systems which utilizes sand retention cavities positioned to receive and retain a portion of the fluidized particulate. A third aspect of the present invention relates to an apparatus and method for facilitating the flow of sand and char fragments from a first compartment to a second compartment while minimizing the flow of gases between the first and second compartments.

7 Claims, 11 Drawing Sheets

BIOMASS GASIFICATION SYSTEM AND METHOD

CROSS-REFERENCE TO RELATED APPLICATIONS

This application claims priority from U.S. Provisional Patent Application Ser. No. 60/257,427, filed Dec. 21, 2000, now abandoned.

BACKGROUND OF THE INVENTION

1. Field of Invention

This invention relates to gasification systems for the production of electricity from biomass, such as shredded bark, wood chips, sawdust, sludges and other carbonaceous fuels or feedstocks. More particularly, the present invention relates to an improved method of operating a parallel entrained bed pyrolysis unit with improved circulation and reduced erosion of system components.

2. Description of Related Art

Biomass gasification systems have been developed which are useful for the production of electrical power in remote areas or in areas wherein a large amount of agricultural biomass waste is produced. Current biomass gasification systems generally rely on combustion of a portion of the biomass feedstock to provide the heat required for gasification of the remainder of the biomass feedstock. However, the combustion of a portion of the raw biomass stream for heat production can significantly reduce the overall efficiency of the gasifier system. It has also proven advantageous to utilize the waste carbonaceous char produced in the gasification as a fuel source for generating heat in a combustor. Since the char is basically a waste product from the gasifier, its consumption in the combustor has less of an adverse effect on the system efficiency than is seen in systems wherein a portion of the raw biomass is used as a combustor fuel source.

U.S. Pat. No. 4,828,581 to Feldmann et al, describes an exemplary gasifier system for the production of fuel grade gas from carbonaceous fuels using very high biomass throughputs in a fluidized bed gasifier operating at low inlet gas velocities. The process described in Feldmann et al. uses a combustor to heat a bed of fluidized sand, which is directed to a gasifier wherein the heated sand serves as a heat source for the pyrolysis of the biomass material. Unlike prior systems, the system of Feldmann et al. relies on the entrainment of char in a flow of sand from the gasifier outlet to allow operation at an advantageously low inlet velocity of as low as 0.5 ft/sec but with a biomass throughput from 500 to 4400 lbs/ft$^2$-hr. The Feldman et al. system is suited to the production of a medium BTU gas which may be used as a fuel source for the production of electricity in a standard gas fired boiler/turbine system.

One of the problems commonly associated with the use of such fluidized bed gasifier systems is the erosion of the piping comprising the systems by the circulating sand used to transfer heat within the gasifier system. This problem has been found to be especially severe at bends in the system piping, wherein the circulating sand can severely erode the piping. In severe cases, this erosion can shorten the lifetime of the gasifier system and may lead to catastrophic failure of the piping.

In fluidized bed systems wherein sand is used as a heat transfer medium from a combustor to a gasifier, it is necessary to minimize or eliminate the leakage of oxygen containing gases from the combustor into the gasifier. Contamination of the gasifier with oxygen results in the undesirable formation of carbon dioxide and water from the CO and $H_2$ end products of the gasification reaction, lowering the efficiency of gasification. However, it has proven difficult in prior systems to develop a method whereby the sand may be transported from the combustor to the gasifier and back while maintaining an air tight seal to prevent entry of oxygen into the gasifier.

In some instances, depending upon the nature of the feedstock used, these prior systems have also experienced problems resulting from the agglomeration of the ash, sand, and char mixture, and subsequent blockage of flow through the system. At the high operating temperatures of gasifier systems, at least a portion of the agglomeration of ash is the result of the partial melting of the ash constituents. It would clearly be desirable to develop a method of reducing or eliminating the agglomeration of the ash, sand and char mixture.

Accordingly, it is an object of the present invention to provide an improved method of directing the flow of sand through a parallel entrained bed pyrolysis system whereby erosion of system components is minimized.

It is another object of the present invention to provide an improved method of allowing the flow of sand and char in a fluidized bed pyrolysis system while maintaining and air tight seal between the gasifier and the combustor components of the system.

It is yet another object of the present invention to provide an improved method of reducing or preventing the agglomeration of ash, sand and char in a fluidized bed pyrolysis system.

SUMMARY OF THE INVENTION

The process system according to this invention relates to improvements to a parallel entrainment fluidized bed gasifier system. A first aspect of the present invention relates to a method for reducing ash agglomeration in a parallel entrainment fluidized bed gasifier/combustor system. A carbonaceous feedstock is provided and supplemented with a quantity of MgO prior to introduction into the gasifier combustor system. Upon gasification and combustion, the MgO alters the eutectic of the resultant ash to raise the melting point and substantially reduce the agglomeration of ash and sand which results from partial ash melting at high temperatures.

A second aspect of the present invention relates to an apparatus and method for reducing erosion at piping bends in fluidized particulate piping systems which utilizes sand retention cavities positioned at the piping bends to receive and retain a portion of the fluidized particulate. The retained fluidized particulate serves as an ablatable buffer to protect the surface of the piping bends from erosion by the flow of particulate impacting the wall.

A third aspect of the present invention relates to an apparatus and method for facilitating the flow of sand and char fragments from a first compartment to a second compartment while minimizing the flow of gases between the first and second compartments. A surger chamber is provided for receiving a flow of sand and char fragments from the first compartment. The surger chamber includes an inlet nozzle disposed to deposit the sand and char mixture into the lower portion of the surger chamber. An outlet is disposed above the point at which the nozzle deposits sand and char mixture into the surger chamber, such that the outlet is disposed to allow the gravitationally driven flow of sand and char from the surger chamber to the second compartment.

Thus, when operating, the surger chamber maintains a quantity non-fluidized sand and char disposed between then inlet nozzle and the outlet, which acts to maintain a substantially gas resistant seal between the first and second compartments.

DETAILED DESCRIPTION OF THE INVENTION

Figure 1:
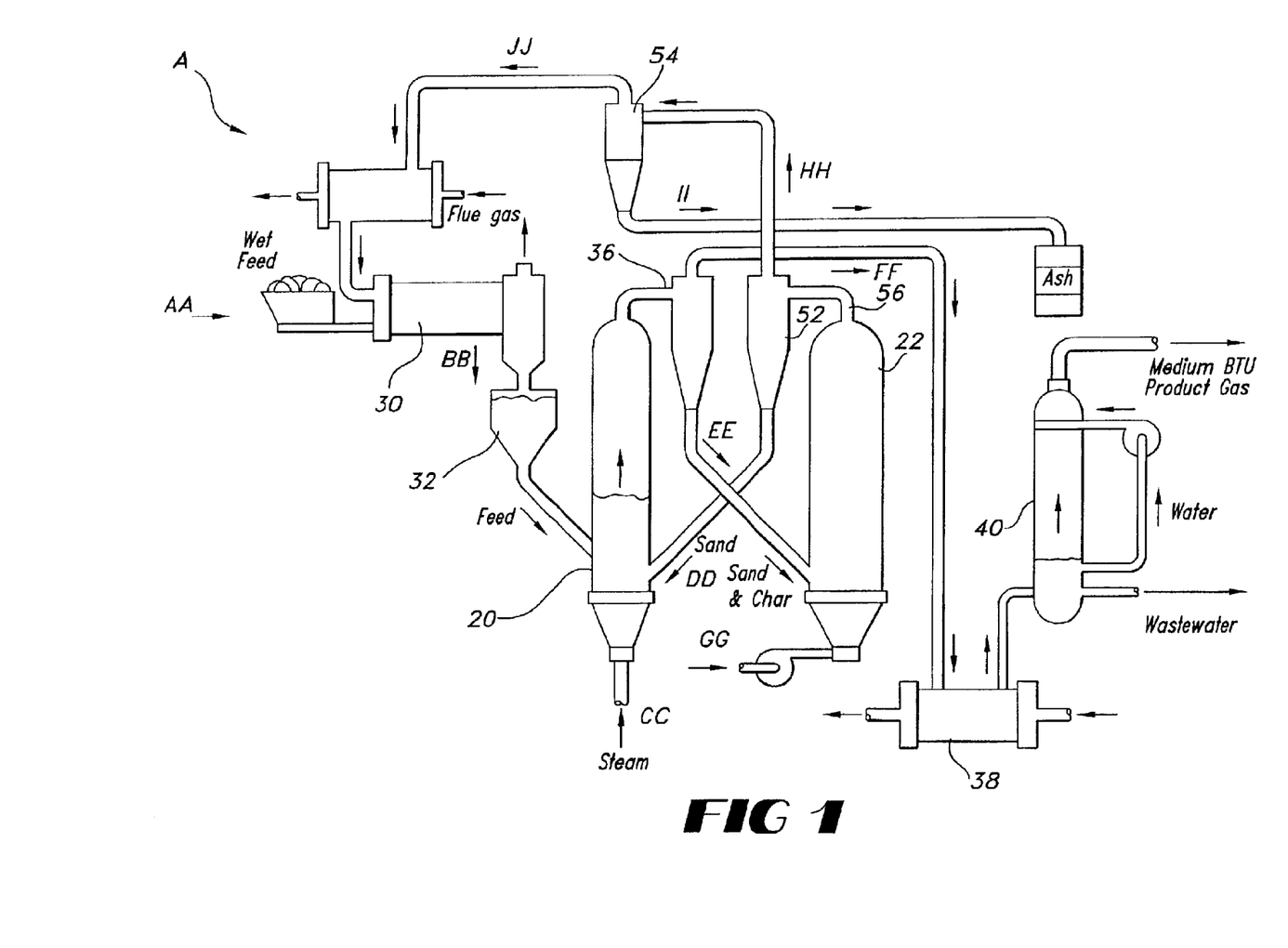
FIG. 1 is a block diagram illustrating a gasifier system useful in the process according to a preferred embodiment of the present invention.

The basic method of operating a parallel entrained bed pyrolysis unit is similar to that disclosed in U.S. Pat. No. 4,828,581 to Feldmann et al., incorporated fully herein by reference as if fully set forth. As illustrated in FIG. 1, the gasifier system A of the present invention generally includes a gasifier 20 and a combustor 22 which operate cooperatively to convert biomass into heat and a useful medium BTU product gas. Combustor 22 operates to convert residual char left over after gasification of biomass in gasifier 20 into heat. The heat produced in combustor 22 is then transferred to gasifier 20 to drive the gasification reaction. This allows for an increase in system efficiency by eliminating the need for consumption of a separate fuel source to provide heat to drive the gasification reaction.

In gasifier system A, feedstock material AA is first passed through a dryer 30 wherein any entrained water is evaporated to produce dried feedstock BB, which is routed into a storage bin 32 for storage prior to introduction into gasifier 10.

Gasifier 20 may be a standard fluidized bed gasifier which receives dried feedstock BB and subjects it to heat in an oxygen-free environment, partially volatilizing the feedstock to release a mixture of H2, CO, CH4 and C02. Gasifier 20 is heated by a sand stream DD or other inert fluidized material which is received from combustor 22. Sand stream DD is fluidized by blowing a flow of steam CC through the sand from the lower portion of gasifier 20 through a gas distributor 24. Feedstock stream BB and sand stream DD are both introduced into gasifier 20 in proximity to gas distributor 24.

Figure 2:
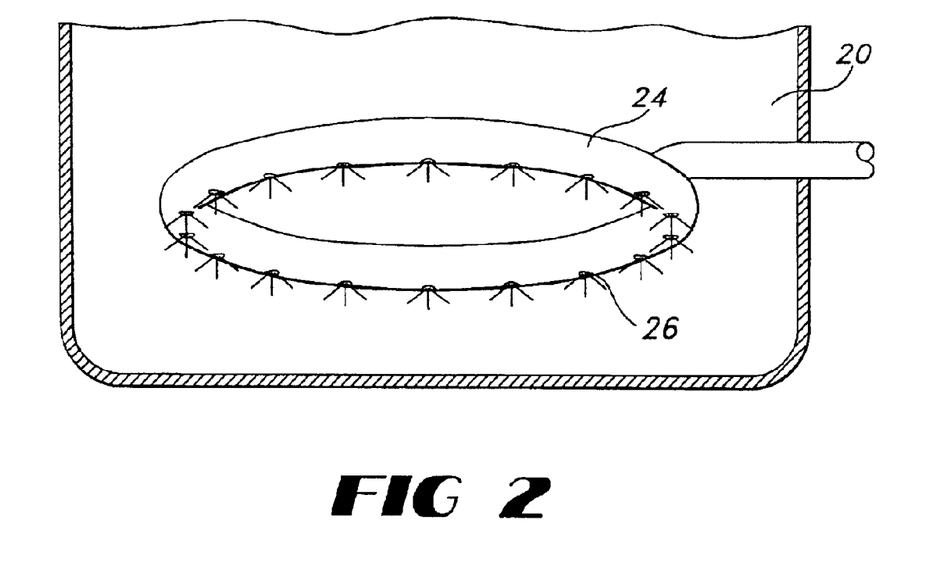
FIG. 2 illustrates a gas distributor in accordance with a preferred embodiment of the present invention.

Gas distributor 24 can be of any conventional type, such as the perforated plate-type gas distributors most commonly used in fluidized bed systems. However, as illustrated in FIG. 2, in the preferred embodiment, an improved gas distributor 24 includes a plurality of pipes disposed in the bottom portion of gasifier 20, each having downwardly disposed injection holes 26 for injecting air into the sand bed to fluidize it. The downward orientation of the injection holes 26 ensures that any tramp material is blown back up into the fluidized section of the bed. Thus, the entirety of the bed is fluidized, preventing the accumulation of the tramp material in the base of the vessel and ensuring that the sand is continually circulated, preventing the formation of cold spots in the gasifier vessel. This is advantageous over the more traditional perforated plate-type gas distributors which can allow dead spots and incomplete circulation in the gasifier 20.

Gasifier 20 operates as a circulating bed gasifier in that the char formed during gasification of feedstock BB retains the general size and shape of the feedstock and is circulated out the exit port of gasifier 20 and into a cyclone separator 36. Cyclone separator 36 separates the entrained sand and char which is circulated from gasifier 20 to form a sand and char stream EE and a product gas stream FF. Product gas stream FF comprises at least CO and H2, but may include a variety of other gases depending upon the characteristics of input feed stream BB. Product gas stream FF may be directed through a heat recovery unit 38 and a scrubber 40 to remove any residual particulates or char. Gasifier 20 is essentially a hybrid having an entrained zone for transfer above a fluidized bed gasifier.

Figure 3:
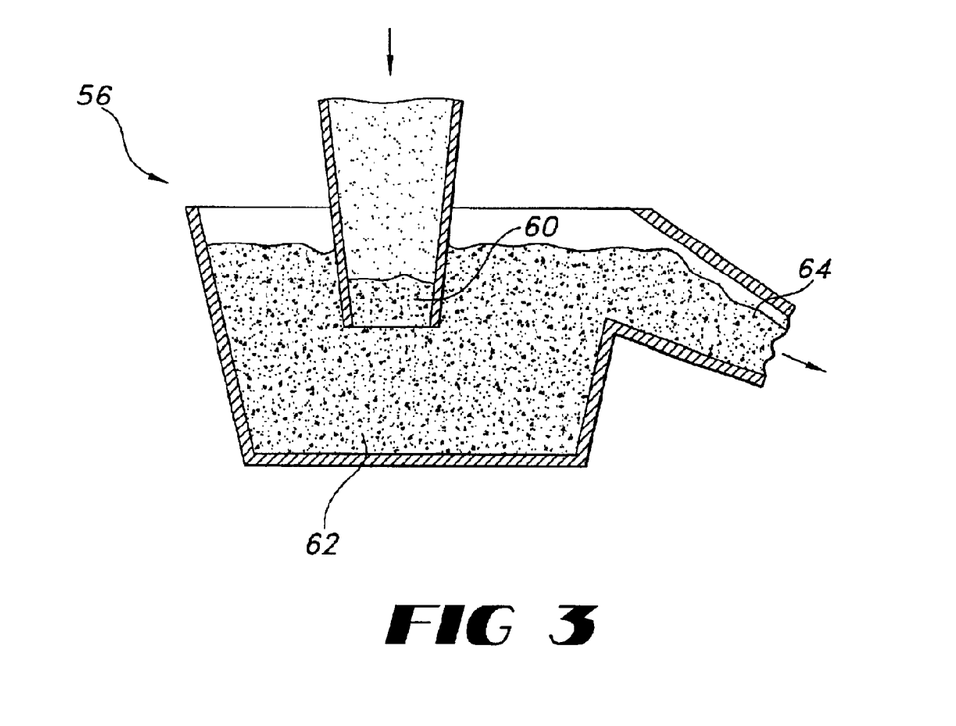
FIG. 3 illustrates a surger pot for allowing the transfer of sand and char between the gasifier and combustor components of the gasifier system of FIG. 1 while maintaining a substantially gas tight seal between the gasifier and combustor.

Leakage of oxygen into gasifier 20 would decrease the efficiency of the gasification reaction and increase the undesirable combustion of the product gas to $CO_2$ and $H_2O$. In order prevent such oxygen leakage into the gasifier it is desirable to maintain a substantially air-tight seal between the combustor 22 and the gasifier 20. This may be accomplished in part through use of a surger pot 56 which allows movement of the sand and char accumulated from gasifier cyclone 36 to combustor 22. As illustrated in FIG. 3, surger pot 56 works by directing sand and char downward from gasifier cyclone 36 through a nozzle 60 into surger a chamber 62. As sand accumulates, it fills surger chamber 62 to a level above the outlet of nozzle 60 whereupon a portion of the sand flows via the force of gravity through an outlet 64 and into combustor 22. A similar second surger pot 58 is positioned below combustor a cyclone separator 52 for allowing flow of heated sand back to gasifier 20. Use of these surger pots allows for transfer of sand and char between the gasifer 20 and combustor 22 with a minimum of gas exchange therebetween.

Sand and char stream EE is directed from gasifier cyclone 36 to combustor 22 wherein the sand is again fluidized and the char is combusted to ash to provide heat to reheat the sand before recycling the sand to gasifier 20. In general, the sand in combustor 22 is fluidized by the injection of air GG from below, again circulating the sand and ash mixture so that it passes out an exit port 50 in the top region of combustor 22 to combustor cyclone separator 52 which separates out the sand for recirculation to gasifier 20. A mixture of flue gas and ash HH exits the top of combustor separator 52 and is directed to ash recovery cyclone 54. Ash recovery cyclone 54 separates the ash stream JJ from the flue gas stream KK. In the preferred embodiment, the ash is then collected as waste and the flue gas stream KK is directed to dryer 30 as a heat source for drying raw feedstock AA.

Gasifier system A operates with a recirculating particulate phase and at inlet gas velocities in the range required to fluidize the sand or other recirculating particulate phase. For example, a velocity of 0.8 to 2 ft/sec with a 20×50 mesh sand has allowed smooth stable operation. Velocities of 0.5 to 7 ft/sec can be used. Gasifier system A can operate at wood feed rates that exceed 3000 lbs/hr of dry biomass per square foot of reactor cross sectional area. Throughputs of 4400 lbs-ft$^2$/hr are achievable and possibly even higher.

In a preferred low inlet gas velocity high throughput embodiment, biomass gasifier system A can operate with biomass throughputs of from 100 and preferably 500–4400 lb/ft$^2$-hr but with inlet gas velocities of 0.5–7 ft/sec. These low gas inlet velocities also serve to reduce the erosion caused by circulation of the mixed bed material, which can be a problem in systems having a high gas inlet velocity.

Figure 4:
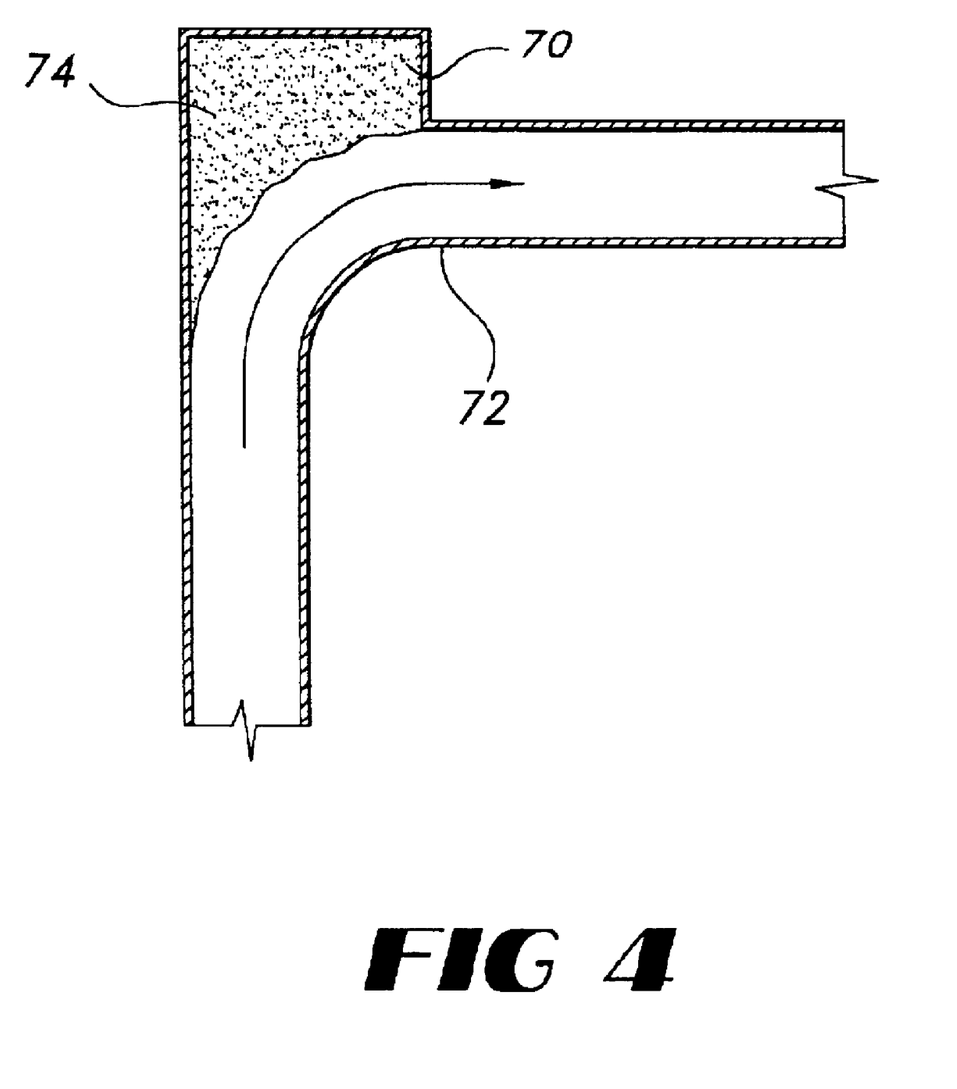
FIG. 4 illustrates a sand retention cavity for reducing piping erosion in accordance with a preferred embodiment of the present invention.

As shown in FIG. 4 erosion of the piping of gasifier system A which is utilized to transfer sand can be minimized through the use primarily straight piping interconnected via sharp bends having sand retention cavities 70. For example, in the currently preferred embodiment, sand retention cavities 70 are utilized at the piping at sharp 90 degree piping bends 72 located adjacent the top of both gasifier 20 and combustor 22. In operation, sand collects within the sand retention cavity and serves as an ablatable buffer 74 to deflect moving abrasive flows of sand away from the piping surface. Since the sand is being deflected by a stationary sand buffer rather than the piping surface, erosion of the piping surface is minimized. Generally, the sand retention cavities 70 should have a depth of approximately one half of the diameter of the piping. If a sand retention cavity 70 is too shallow, sand will not accumulate within the sand retention cavity 70 and erosion will not be adequately reduced.

The method of operating a gasifier according to this invention comprises introducing inlet gas at a gas velocity generally less than 7 ft/sec to fluidize a high average density bed in gasifier 20. The high average density bed is formed into a dense fluidized bed in a first space region by means of the inlet gas CC. The dense fluidized bed contains a circulating first heated relatively fine and inert solid bed particle component. Carbonaceous material is inputted into the first space region with dense fluidized bed at a rate from 100–4400 lbs/ft$^2$-hr and more preferably 500–4400 lbs/ft$^2$-hr and endothermic pyrolysis of the carbonaceous material is accomplished by means of the circulating heated inert material so as to form a product gas. Contiguous to and above the dense fluidized bed a lower average density entrained space region is formed containing an entrained mixture of inert solid particles, char and carbonaceous material and the product gas. Surprisingly, the char maintains relatively the same size and shape as the input feedstock material. This results in an approximate 1:1 ratio of char to sand due the differing densities of the char and sand density.

The entrained mixture is then removed from the entrained space region of the gasifier 20 to a separator 36 such as a cyclone wherein the entrained mixture of inert solid particles, char and carbonaceous material is separated from the product gas. Residence time of the carbonaceous material in the gasifier 20 typically does not exceed 3 minutes on average. Finally, at least the inert solid particles are returned to the first space region after passage through an exothermic reaction zone such as a combustor 22 to first heat the inert particles. To facilitate the exothermic reaction, it can be advantageous to route the entire entrained mixture absent product gas through the combustor 22 so that the char can be combusted as a heat source.

In the system of the preferred embodiment of the present invention, the fluidized bed of heated sand or other relatively inert material at the lower end of the gasifier 20 forms a region of relatively high density. Inputted wood or other carbonaceous material, being lighter than the sand, floats on the fluidized sand. As the wood is gasified by the hot sand, an entrained region of sand, char and carbonaceous particles forms in the upper end of the gasifier 20.

The highest concentration of entrained wood and is be found at the top of the densely fluidized zone within the gasifier 20. Entrained hot sand circulates through the entrained wood and char. As the carbonaceous particles pyrolyze, they generate gas forming a high velocity region above the fluidized bed. Despite a low gas inlet velocity below the bed the gas velocity above the fluidized bed becomes high enough to actually remove particles from the bed. By operating at low inlet gas velocity, high residence time (up to 3 minutes on average) in the reaction vessel can be achieved while still allowing high throughputs of carbonaceous material generating gas to form the entrained region above the fluidized region.

In this system, solids are removed from the top of the vessel, and removed from the system by entrainment despite the low inlet gas velocities below the bed. This is made possible by the design of using a fluidized region, above which is an entrained region from which all bed particles including inerts and char are removed. Entrainment occurs in part because of the gas generated in situ contributing significantly to the volume of gas moving through the reaction vessel, while avoiding destructive slugging.

The carbonaceous material fed to the gasifier 20 can have greater than 60% of the available carbon converted upon a single pass through the gasifier system A. The remainder of the carbon is burned in the combustor 22 to generate heat for the pyrolysis reaction. If other fuel is used in the combustor 22, then additional carbon can be converted in the gasifier 20. With wet fuels, such as municipal waste, carbon conversions might vary upward or downward depending on the operating temperature of the gasifier 20.

The inlet gas fed to the gasifier 20 typically can be steam, recycled-product-gas, combustion by-product gas, inert gases such as nitrogen, and mixtures thereof. Preferred gases for the invention are steam and recycled-product-gas. Addition of other gases such as inert gases or combustion by-product gases will reduce the efficiency and advantages of the invention. Likewise, the addition of air or oxygen reduces the efficiency and advantages of the invention and, thus, is not preferred.

Steam is a convenient gas because it is relatively cheap and can be condensed from the product gas prior to distribution. Nitrogen, on the other hand, while allowing the same carbon conversion and the same product gas distribution remains in the product gas as diluent thereby reducing its utilization value. Air or oxygen are generally not used because the heat required to gasify the feed is introduced by the hot circulating inert solids whereas in some prior art systems the oxygen burns a portion of the char and product gases to provide heat. Use of air or oxygen would tend to reduce the utilization value of the product gas.

In this invention entrained material exits the vessel near the top of the gasifier 20 to a cyclone or other inertial settling device 36 for separating the product gas from the char, carbonaceous material and inert material. All system solids are entrained except for unwanted tramp material such as scrap metal inadvertently introduced with the fuel feedstock, for which a separate cleanout provision may be needed.

The system of the present invention is versatile and could be combined with any type of combustor, fluidized, entrained, or non-fluidized, for heating the inert material. The inert material is heated by passage through an exothermic reaction zone of a combustor to add heat. The inert material is understood to mean relatively inert as compared to the carbonaceous material and could include sand, limestone, and other calcites or oxides such as iron oxide. Some of these "relatively inert materials" actually could participate as reactants or catalytic agents, thus "relatively inert" is used as a comparison to the carbonaceous materials and is not used herein in a strict or pure qualitative chemical sense as commonly applied to the noble gases. For example, in coal gasification, limestone is useful as a means for capturing sulfur to reduce sulfate emissions. Limestone might also be useful in catalytic cracking of tar in the gasifier 20.

Other useful materials may also be added to the gasifier feedstock to improve system operation. For example, it has been found that the agglomeration of ash, sand, and char in gasifier system A can be reduced by adding of magnesium feedstock to reduce aggregation in accordance with the present invention.

EXAMPLE 1

Hybrid poplar and the switch grass were tested as high growth species feedstocks for use in the gasification system of the present invention. These high-growth species feedstocks result in ash components that can cause difficulty in operation of the gasification system. It is hypothesized that high growth species generally concentrate certain elements in their ash. These are represented by the more soluble alkali and alkaline earth elements which are found as alkali and alkaline earth oxides in the ash analysis. When the ashes of the hybrid poplar and switch grass were analyzed, high levels of potassium and phosphorous and both higher and lower levels of silica relative to previous wood feedstocks tested were found as shown in Table 1.

During two of the initial tests with the hybrid poplar feed material, some Stability was noticed in sand circulation in the gasifier system. This Stability was determined to be the result of agglomeration in the combustor sand bed to form ash agglomerates caused by low melting ash constituents or by reaction of the ash oxides on the surface of sand particles. The ash agglomerates were loose agglomerates that easily disintegrated at

TABLE 1

| MINERAL COMPONENT | % BY WEIGHT PINE ASH | % BY WEIGHT SWITCH GRASS ASH | % BY WEIGHT HYBRID POPLAR ASH |
|---|---|---|---|
| $SiO_2$ | 32.46 | 69.92 | 2.59 |
| $Al_2O_3$ | 4.50 | 0.45 | 0.94 |
| $TiO_2$ | 0.40 | 0.12 | 0.26 |
| $Fe_2O_3$ | 3.53 | 0.45 | 0.50 |
| CaO | 49.20 | 4.80 | 47.20 |
| MgO | 0.44 | 2.60 | 4.40 |
| $K_2O$ | 2.55 | 15.00 | 20.00 |
| $Na_2O$ | 0.44 | 0.10 | 0.18 |
| $SO_3$ | 2.47 | 1.90 | 2.74 |
| $P_2O_5$ | 0.31 | 2.60 | 5.00 |
| SrO | — | 0.04 | 0.13 |
| BaO | — | 0.22 | 0.70 |
| $Mn_2O_4$ | — | 0.15 | 0.14 |
| Total Oxides | 96.30 | 98.35 | 84.78 |
| Carbon Dioxide, $CO_2$ |  |  | 14.00 | oxide (MgO) to the feedstock material. This agglomeration is generally a result of the partial melting of the ash at the high temperatures present in combustor 20, and consequential agglomeration of the ash, sand and any residual char into a non-fluidizable mass which may potentially disrupt flow in the fluidized system. In prior systems, calcium oxide (CaO) and alumina ($Al_2O_3$) have been added in an attempt to reduce agglomeration of ash by diluting the ash. However, it has been found that the addition of MgO is even more effective to reduce agglomeration. The presence of MgO chemically alters the low temperature eutectic of the ash mixture, raising the melting point to effectively reduce agglomeration of ash via melting. One of ordinary skill in the art should recognize that other materials which alter the low temperature eutectic of the ash mixture to raise its melting point may also be useful in the present invention. Preferably MgO is added to the feedstock of the present invention at a weight percent or between 1% and 25% of the feedstock weight. More preferably at least 2% and even more preferably between 2% and 10% MgO is added to the room temperature when touched. An examination of the hybrid poplar ash analysis showed the ash to be 95.0 percent basic oxides. Hence, one likely agglomeration mechanism would be the fluxing of the acidic bed material ($SiO_2$) by the basic ash. However, agglomeration of ash-CaO mixtures in DTA tests (discussed below) have discounted ash fluxing of the sand bed as the likely cause of the agglomeration.

The presence of low-melting species initially was thought to be inconsistent with the reported ash fusion temperatures, all above 2700 F. However, it was realized that some species, such as those containing potassium, may have been volatilized during the analytical ashing process so that the reported ash fusion values may represent potassium-free ash.

The ash agglomerates formed during the gasifier system tests were submitted for scanning electron microscopic examination. The microscopic examination revealed that the sand particles had been glued together with a low melting material. These samples then were analyzed by electron microprobe in an attempt to identify the troublesome material. This analysis showed that the "glue" between the sand particles consisted of 67.74 percent $SiO_2$, 16.1 percent $K_2O$, 0.6 percent CaO, 5.47 percent $TiO_2$, and 10.1 percent $Fe_2O_3$. Similarly, analysis of the surface coating on the particle showed the same species in the same general ratio. The results of these analyses showed that the fused material did not contain sulfur or chlorine. Most of the previous work on ash agglomeration from biomass species has focused on the presence of sulfur and on the resulting formation of low melting sulfates as the primary cause of agglomeration of a sand bed. The agglomeration found in the combustor of the system of the present invention, based on the microprobe analysis, was not caused by the formation of sulfates, but appears to result from the formation of compounds such as alkali-silicates.

Figure 5:
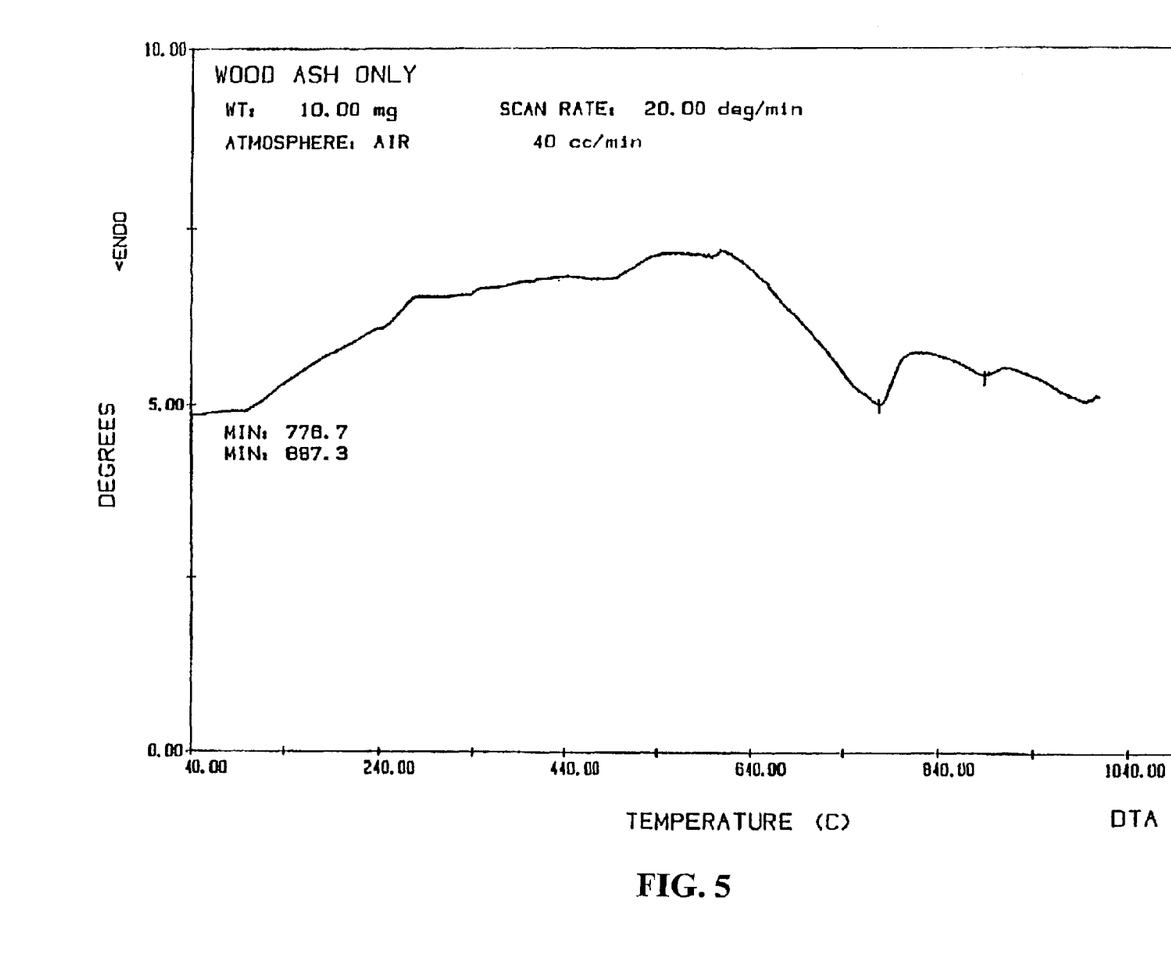
FIG. 5 is a graph of Differential Thermal Analyzer (DTA) data for wood ash only.
Figure 6:
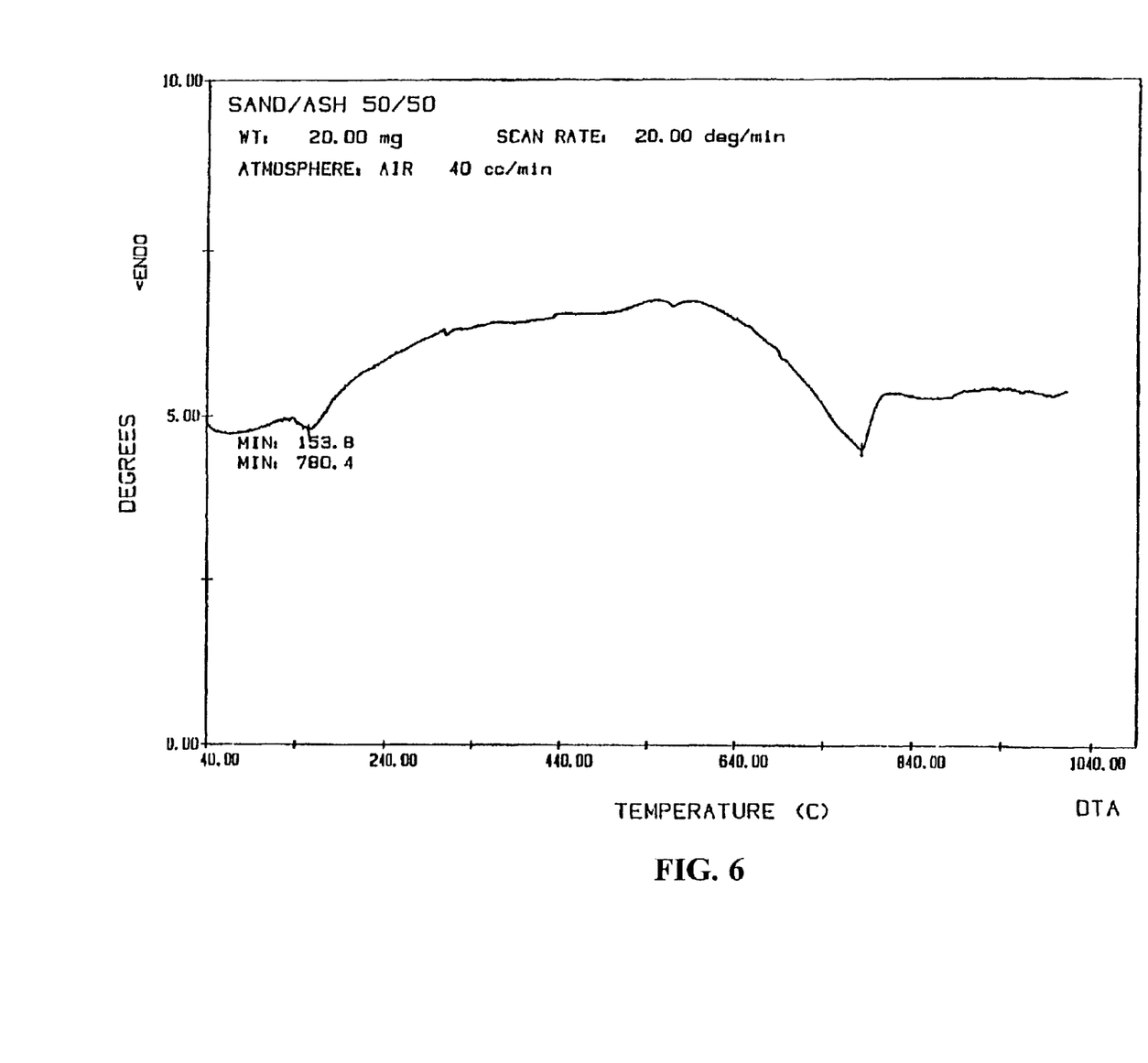
FIG. 6 is a graph of Differential Thermal Analyzer (DTA) data for a 50/50 mixture of sand and wood ash.

To evaluate the behavior of the ash, additional tests were run in a Differential Thermal Analyzer (DTA). The DTA was used to identify endotherms caused by melting of compounds formed by the reacting of the ash constituents with the bed material and/or within the ash itself. Typical DTA curves are shown in FIGS. 5 through 9. These show that two primary endothermic peaks are present in each of the samples suggesting fusion occurred at approximately 500 C. and 770 C. for wood ash alone or a 50/50 mixture of sand and wood ash (FIGS. 5 and 6 respectively).

The strong endotherm at about 770 C. suggests that the material could be a single well defined compound or it could be a eutectic formed in a binary and/or ternary system of compounds. Compounds with melting points near 770 C. consistent with the ash analysis would be compounds containing potassium, phosphorus, calcium, and silica and perhaps, sulfur. The electron probe results rule out sulfur, but suggest that titanium and iron could be involved. The melting point of KCl is 776 C. and it sublimes. However, the ultimate analysis (Table 1) reports low levels of chlorine (0.01 percent) in the wood. If KCl were present in the ash, it would have had an impact on the ash fusion temperature (which remained above 2700 F.). Potassium metaphosphate ($KPO_3$) has a melting point of 807 C. and potassium tetrasilicate (anhydrous) has a melting point of 770 C. Both could contribute to the agglomeration.

Figure 10:
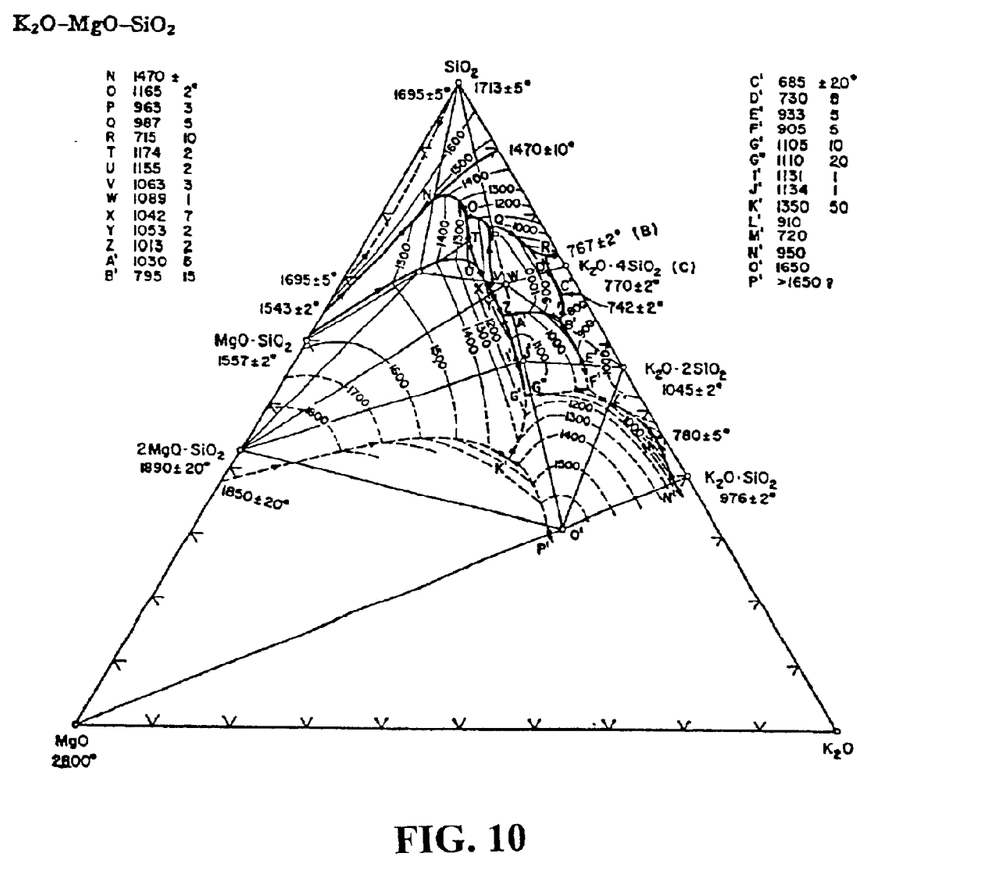
FIG. 10 is a phase diagram for $K_2O$—$MgO$—$SiO_2$.

Compounding this simplistic approach is the greater probability that eutectics exist between binary and ternary oxide systems such as $K_2O$, $SiO_2$ and one of the other oxides. A review of the phase diagram for the system $SiO_2$—$K_2O5iO_2$ (FIG. 10) suggests that beside the well defined melting point of 770 C. for the compound anhydrous potassium tetrasilicate ($K_2O$ $4SIO_2$ or $K_2SiO_9$, 78% $SiO_2$—22% $K_2O$) a eutectic exists at about 68 percent $SiO_2$ 32 percent $K_2O$ which has a melting point of about 750 C. A eutectic can exist in the system $KPO_3$ $K_4P_2O_5$ with a melting point at 613 C.

With the large reservoir of potassium as oxide in the combustion fluidized sand bed, especially with the hybrid poplar ash, localized reaction between $K_2O$ and $SiO_2$ can occur to form compounds leading to eutectic mixtures on the surface of the sand ($SiO_2$) particles. Gradient concentrations of $K_2O$ in $SiO_2$ are possible in the layer surrounding the sand particle.

Figure 7:
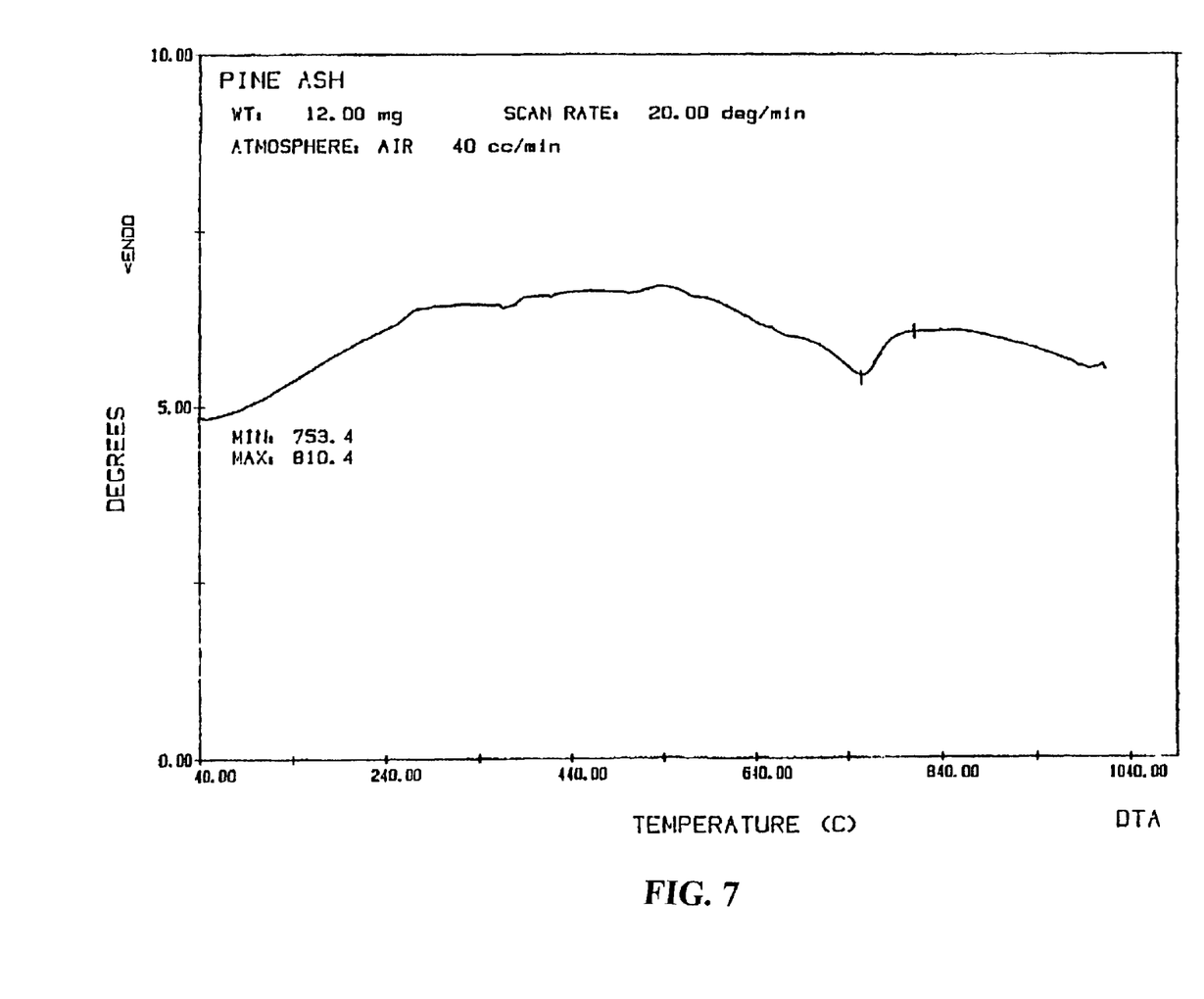
FIG. 7 is a graph of Differential Thermal Analyzer (DTA) data for a mixture of sand and wood ash supplemented with kaolin.
Figure 8:
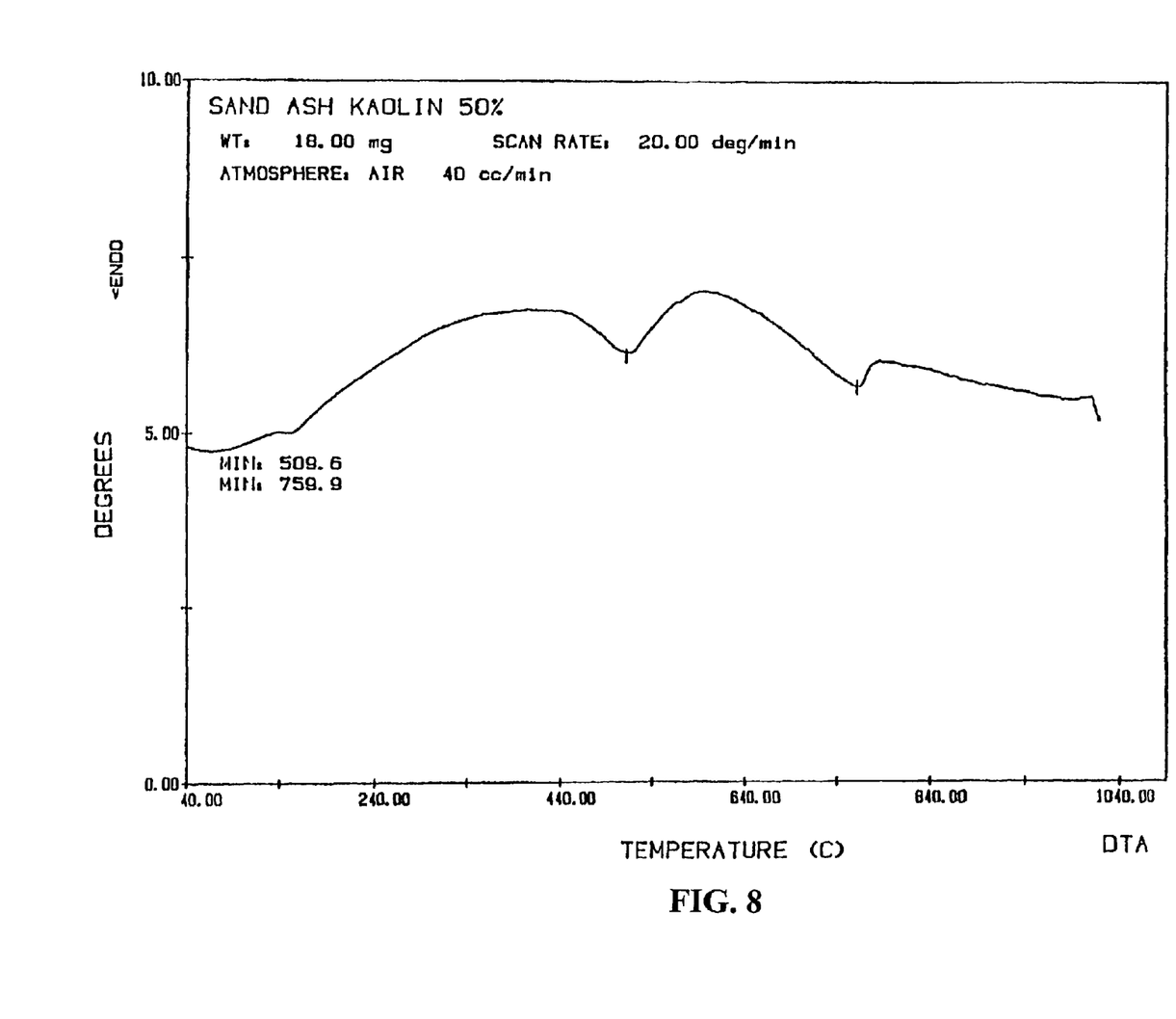
FIG. 8 is a graph of Differential Thermal Analyzer (DTA) data for a mixture of sand and wood ash supplemented with MgO.
Figure 9:
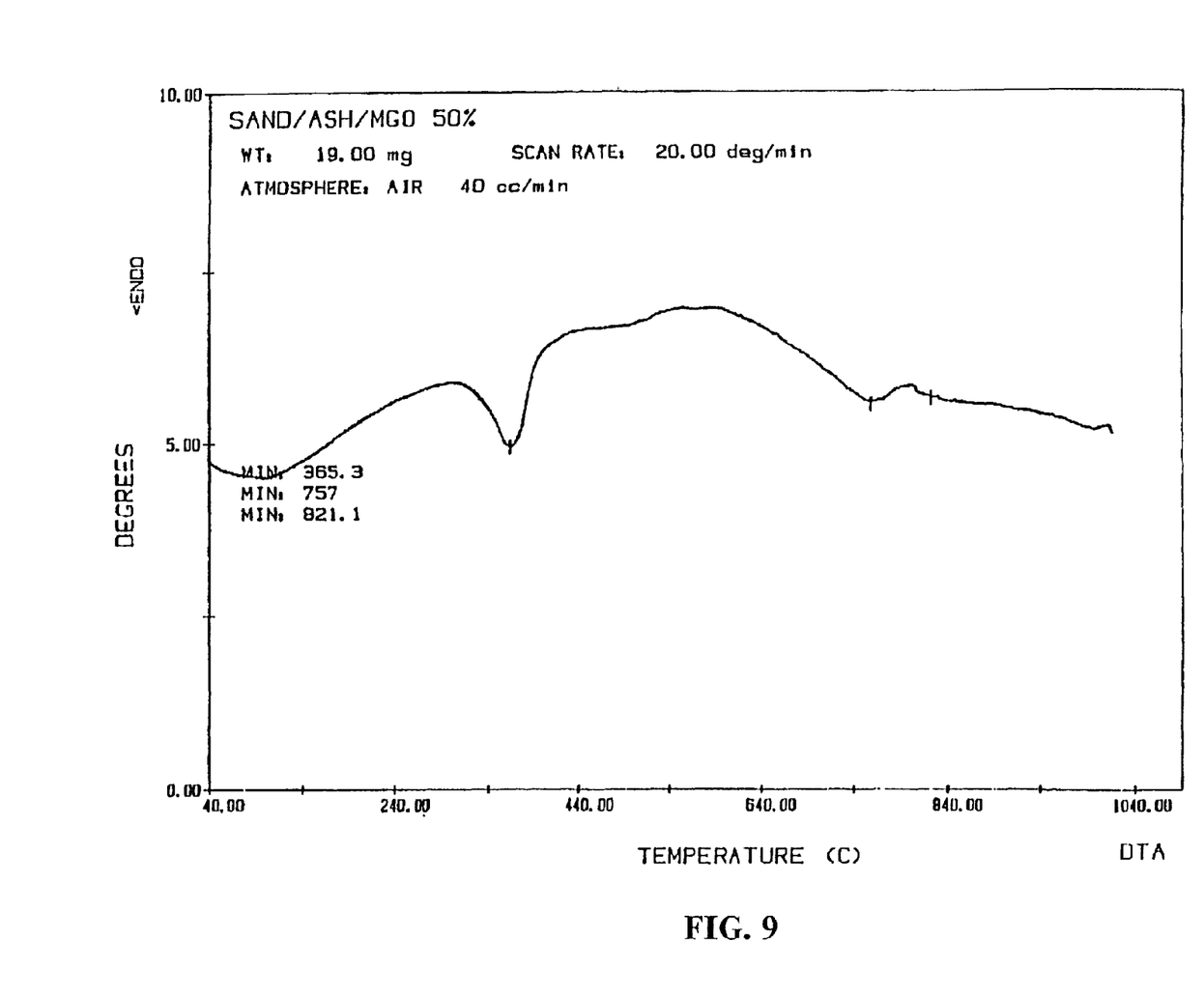
FIG. 9 is a graph of Differential Thermal Analyzer (DTA) data for pine ash only.

If potassium tetra-silicate or related eutectics are the problem, the formation of potassium silicate must then be prevented or the silicate must be modified after forming in order to prevent agglomeration in the bed. As a direct comparison with other types of wood ash, a DTA test was run with pine ash. This curve, as shown in FIG. 7, shows much less severe endotherms than the poplar ash probably due to the low levels of $K_2O$ in the pine ash. Additionally, this material was not agglomerated when removed from the sample cup.

Prior studies have indicated that the tendency of ash to agglomerate the sand bed could be reduced by the addition of additives such as kaolin clay, and CaO. Thus, these substances were tested in the DTA either with wood ash alone or with a 1:1 mixture of wood ash and bed sand. These tests and their results are listed in Table 2. The kaolin clay was ineffective in preventing agglomeration as shown by the continued presence of peaks at 780 C. in FIG. 8 and the formation of agglomerates. Therefore, it was concluded that the reaction rates for the formation of potassium silicate are sufficiently high to effectively prevent the potassium from combining with another acidic oxide (such as alumina) as a means of preventing the agglomeration. Substituting a basic oxide for the sand as the bed material would then provide the means to limit the formation of the low melting silicates to that

TABLE 2

| Sample Description* | Atmosphere | Max Temp./Scan Rate | Observations |
| --- | --- | --- | --- |
| Hybrid Poplar Ash | Air | 1000 C./50° C./min | Peaks at 493 and 772 C., sample agglomerated when removed |
| Poplar Ash + silica sand | Air | 1000 C./50° C./min | Peaks at 492 and 785 C., sample agglomerated when removed |
| Poplar ash + silica sand + CaO | Air | 1000 C./50° C./min | Peaks at 436 and 785 C., sample lightly agglomerated when removed |
| Poplar ash + silica sand + kaolin | Air | 1000 C./50° C./min | Peaks at 495 and 778 C., sample agglomerated when removed |
| Poplar ash + silica sand + MgO | Air | 1000 C./50° C./min | Peak at 367, slight peaks at 506 and 749 C., sample only slightly agglomerated when removed |
| Poplar ash + CaO | Air | 1000 C./50° C./min | Peaks at 420, 493, and 782 C., sample agglomerated when removed |
| Poplar ash from twigs | Air | 1000 C./50° C./min | Peaks at 792 and 889 C., sample agglomerated when removed |
| Poplar ash from stem | Air | 1000 C./50° C./min | Small peaks at ~500 C., peaks at 789 and 898 C., sample agglomerated when removed |
| Pine ash | Air | 1000 C./50° C./min | Slight peaks at 740 C., no agglomeration present |

*Proportions on all mixtures are 1:1 or 1:1:1.

which can be formed by the components of the ash itself. In the case of the hybrid poplar ash, the low concentration of silica in the ash will limit the quantity of silicate that can form in the ash. However, because of the bed sand, the level of silicates that can form may still be troublesome.

In the DTA tests summarized in Table 2, the CaO had little effect on the endothermic peaks, but physical examination of the sample after the test showed that the agglomeration was less severe than with the ash alone or with the ash and sand mixture. Surprisingly, it was found that the addition of Magnesia (MgO) provided substantially reduced agglomeration and reduced endothermic peaks shown in FIG. 9 in comparison to ash and sand with or without CaO. All of the remaining tests during this program phase utilized a co-feed of MgO to control the agglomeration in the combustor bed.

MgO was added at a rate approximately equal to the ash composition in the feed material or about 2 percent of the wood feed rate. Although a parametric evaluation of the minimum MgO addition rate was not conducted, qualitatively the 2 percent addition level was adequate to control agglomeration. With MgO added to the combustor bed, the combustion temperature was not restricted during testing.

An extended length was performed to examine the effectiveness of MgO to minimize agglomeration problems as they occur during operation. At the start of the extended length test, MgO feed was held at 25 lb/hr, a level slightly lower than during previous tests. After 4 hours of feeding at this lower MgO level, however, a reduction in performance was noticed indicating some agglomeration had occurred. By increasing the MgO feed back to the previous level of 35 lb/hr agglomeration ceased and smooth operation was restored. Near the end of the test, the MgO feeder motor stalled for a short period which again led to some agglomeration in the bed. When MgO feed was restored, the symptoms of agglomeration were eliminated and smooth operation continued.

There is supporting information in the literature on the effect MgO has on the melting points in the $K_2O$ $SiO_2$ system. Examination of the ternary diagram for the system $K_2O$ MgO $SiO_2$ (FIG. 10) at the 5 mole percent level suggests increases in the 770 C. and lower melting of the $K_2O$—$SiO_2$ system points to 900 to 1000 C.

Figure 11:
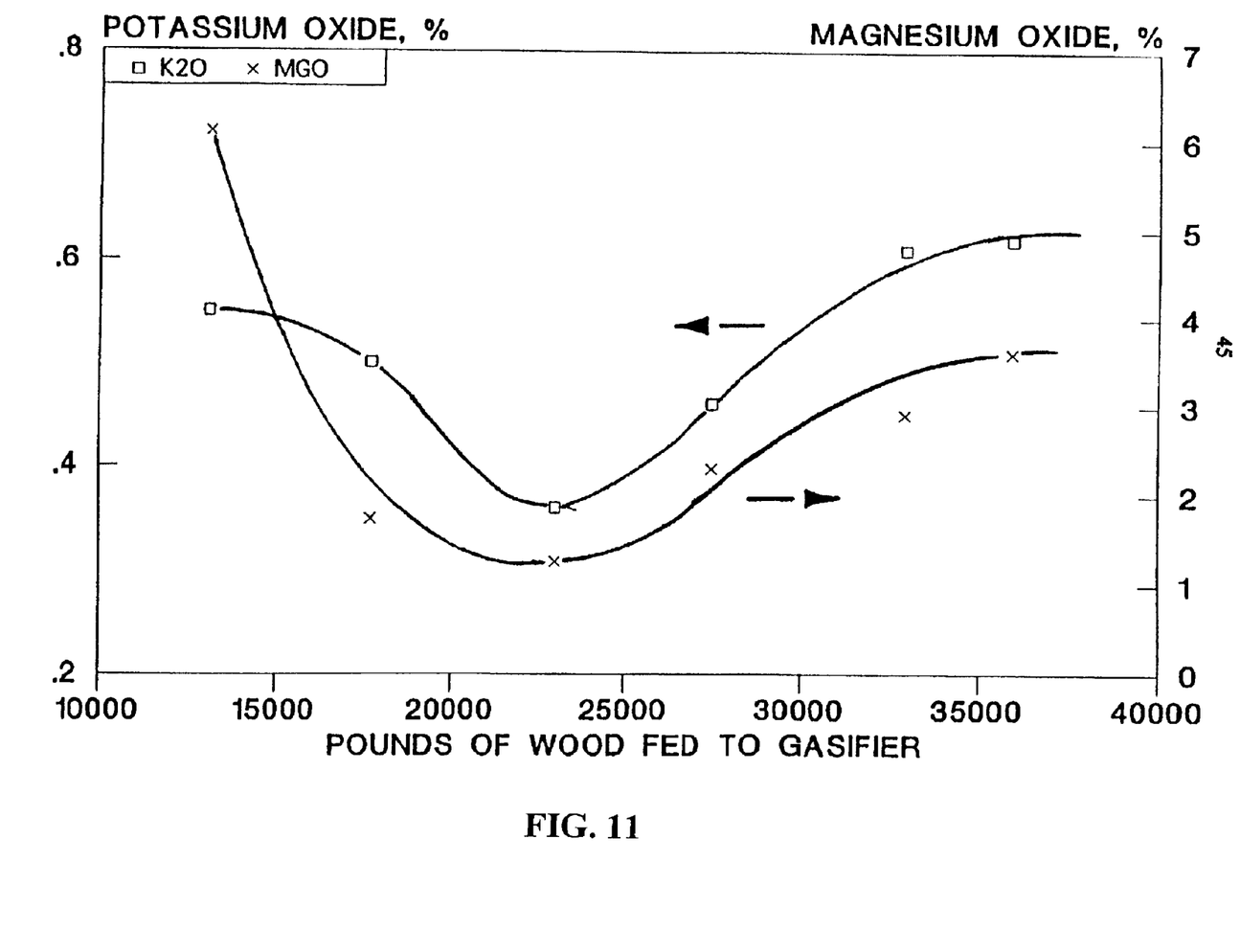
FIG. 11 is a graph of $K_2O$ and $MgO$ content of bed ash components in a system fed with poplar.
Figure 12:
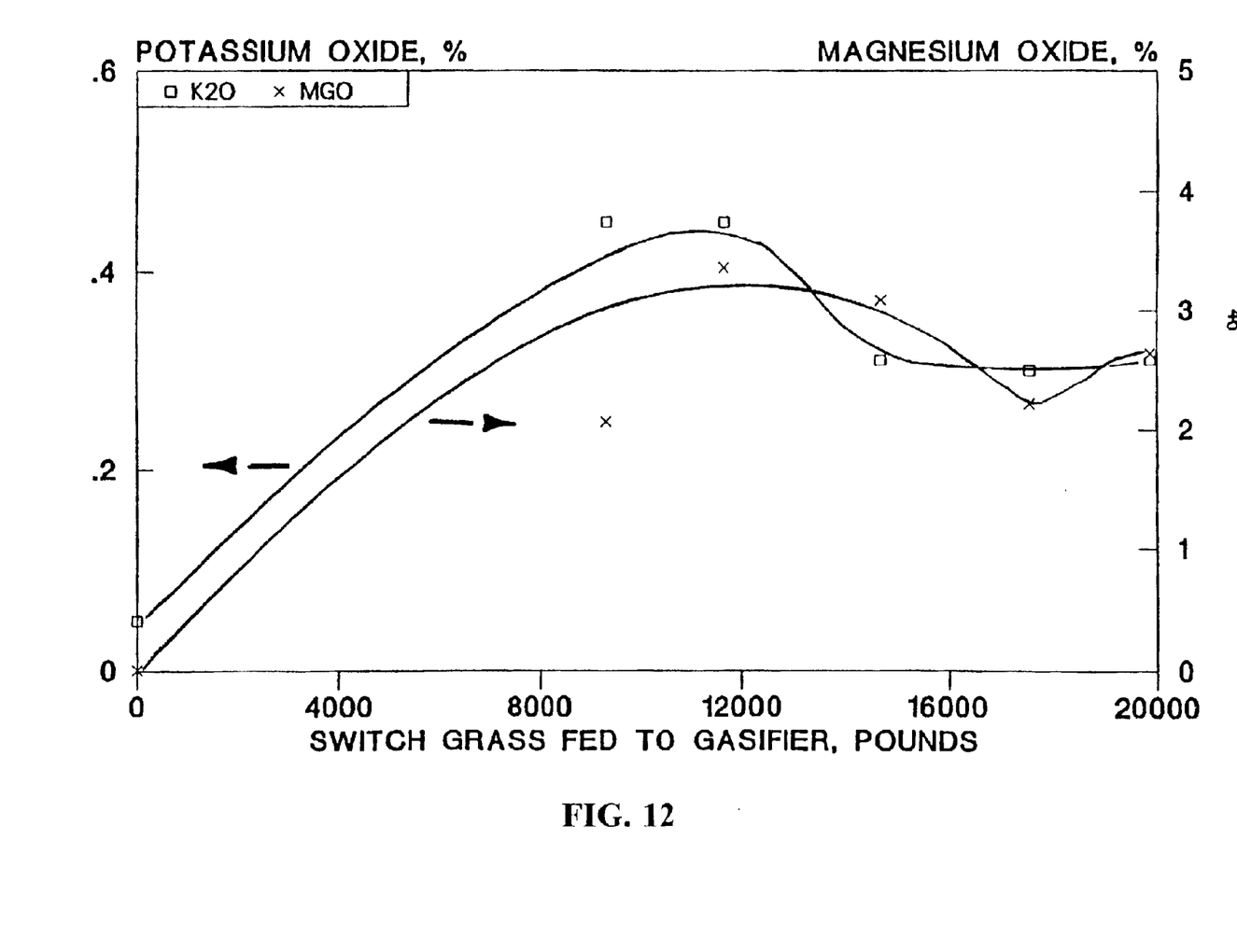
FIG. 12 is a graph of $K_2O$ and $MgO$ content of bed ash components in a system fed with switch grass.

The potassium content in the circulating sand bed was measured at the end of each of the tests with hybrid poplar and switch grass. The results of these individual analyses are presented graphically in FIGS. 11 and 12. The curves show cumulative quantities of feedstock on the X-axis versus bed constituents. As is shown, the potassium content stabilizes in the combustor bed at approximately 0.6percent with the hybrid poplar and 0.5 percent with switch grass. The stabilization is caused by a combination of MgO elutriation and sand makeup in the combustor bed. In both cases, the maximum concentration of MgO at the end of the tests was about 3.5 percent. Such a level of MgO in the bed would provide a reasonable target concentration for control of agglomeration in a commercial gasification facility. Previous testing with other varieties of wood feed material indicate that only the high growth materials require such an addition of MgO due to their much lower potassium in the ash. The "dip" shown in FIG. 15 reflects a large sand makeup during the test procedure.

It thus will be appreciated that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method for reducing ash agglomeration in a parallel entrainment fluidized bed gasifier/combustor system having an operating temperature range, said method comprising the steps of:

providing a carbonaceous feedstock;

supplementing said carbonaceous feedstock with a component sufficient to alter the low temperature eutectic of ash produced by combustion of the feedstock to prevent aggregation of said fluidized bed due to ash melting in the operating temperature range of the gasifier/combustor;

introducing said carbonaceous feedstock into a parallel entrainment fluidized bed gasifier/combustor system wherein said carbonaceous feedstock is converted into a desired gas mixture and ash.

2. The method of claim 1, wherein said component sufficient to alter the low temperature eutectic of the feedstock is MgO.

3. The method of claim 1, wherein between 1% and 25% by weight MgO is added to said carbonaceous feedstock.

4. The method of claim 1, wherein at least 2% by weight MgO is added to said carbonaceous feedstock.

5. The method of claim 1, wherein between 2% and 10% by weight MgO is added to said carbonaceous feedstock.

6. An apparatus for reducing erosion at a piping bend in a fluidized particulate piping system comprising:

a sand retention cavity positioned at the piping bend to receive and retain a portion of said fluidized particulate, said fluidized particulate serving as an ablatable buffer to protect the surface of said piping bend from erosion by said flow of said particulate impacting said wall.

7. An apparatus for facilitating the flow of sand and char fragments from a first compartment to a second compartment while minimizing the flow of gases between said first and second compartments, said apparatus comprising:

a chamber for receiving said flow of sand and char fragments from said first compartment, said chamber including an inlet nozzle disposed to deposit said sand and char mixture into the lower portion of said chamber; and an outlet disposed above the point at which said nozzle deposits said sand and char mixture into said chamber, wherein said outlet is disposed to allow the gravitationally driven flow of sand and char from said chamber to said second compartment;

wherein, when operating, said chamber maintains a quantity non-fluidized sand and char disposed between said inlet nozzle and said outlet, said sand and char acting to maintain a substantially gas resistant seal between said first and second compartments.

* * * * *